(12) United States Patent
Shao et al.

(10) Patent No.: US 10,935,841 B2
(45) Date of Patent: Mar. 2, 2021

(54) BACKLIGHT MODULE, DISPLAY DEVICE AND DRIVING METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jiyang Shao, Beijing (CN); Yuxin Bi, Beijing (CN); Jian Sun, Beijing (CN); Feng Zi, Beijing (CN); Feng Pan, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/453,160

(22) Filed: Jun. 26, 2019

(65) Prior Publication Data

US 2020/0117050 A1 Apr. 16, 2020

(30) Foreign Application Priority Data

Oct. 12, 2018 (CN) .......................... 201811189512.1

(51) Int. Cl.
*G09G 3/36* (2006.01)
*G02F 1/1335* (2006.01)
*G02F 1/13357* (2006.01)

(52) U.S. Cl.
CPC ..... *G02F 1/133602* (2013.01); *G09G 3/3611* (2013.01); *G02F 2001/133601* (2013.01);
(Continued)

(58) Field of Classification Search
CPC .................. G09G 3/3413; G09G 3/36; G09G 2320/0626; G09G 3/3611
See application file for complete search history.

(56) References Cited

U.S. PATENT DOCUMENTS 8,305,332 B2   11/2012  Park et al.
9,084,307 B2    7/2015  Fujita
(Continued)

FOREIGN PATENT DOCUMENTS

CN      2664095 Y    12/2004
CN    104252830 A    12/2014
(Continued)

OTHER PUBLICATIONS

Chinese Office Action in Chinese Application No. 201811189512.1, dated Dec. 16, 2019 with English translation.

*Primary Examiner* — Md Saiful A Siddiqui
(74) *Attorney, Agent, or Firm* — Collard & Roe, P.C.

(57) ABSTRACT

A backlight module, a display device and a driving method thereof are provided. The backlight module includes: a micro control circuit, a selection control circuit, a backlight source including a primary viewing region and a subsidiary viewing region, and a backlight driver chip; the micro control circuit is configured to output a selection signal to the selection control circuit and output a control signal to the backlight driver chip after a scanning of a display sub-region corresponding to the primary viewing region or the subsidiary viewing region is completed; the selection control circuit is configured to select the light-emitting components within the primary viewing region or the subsidiary viewing region according to the selection signal; and the backlight driver chip is configured to supply a drive current to the light-emitting components within the primary viewing (Continued)

region or the subsidiary viewing region that is selected according to the control signal.

20 Claims, 5 Drawing Sheets (52) U.S. Cl.
CPC ............ *G02F 2001/133612* (2013.01); *G02F 2001/133613* (2013.01)

(56) References Cited

U.S. PATENT DOCUMENTS

| | | | | |
|---|---|---|---|---|
| 2007/0091059 A1* | 4/2007 | Kang | ................... | G09G 3/3648 345/102 |
| 2011/0134158 A1* | 6/2011 | Onishi | ................. | G09G 3/3426 345/690 |
| 2018/0174533 A1 | 6/2018 | An | | |

FOREIGN PATENT DOCUMENTS

| | | | |
|---|---|---|---|
| CN | 105096845 | A | 11/2015 |
| CN | 105353918 | A | 2/2016 |
| CN | 105957484 | A | 9/2016 |
| CN | 106683622 | A | 5/2017 |
| KR | 10-1422147 | B1 | 8/2014 |

* cited by examiner

BACKLIGHT MODULE, DISPLAY DEVICE AND DRIVING METHOD THEREOF

CROSS REFERENCE TO RELATED APPLICATIONS

The present application claims priority to the Chinese patent application No. 201811189512.1 filed on Oct. 12, 2018, the entire disclosure of which is incorporated herein by reference as part of the present application.

TECHNICAL FIELD

Embodiments of the present disclosure relate to a backlight module, a display device and a driving method thereof.

BACKGROUND

A liquid crystal display (LCD) has numerous advantages such as thin, power saving, no radiation, etc., and is widely applied in a liquid crystal display device such as a liquid crystal television, a mobile phone, a personal data assistant, a digital camera, a computer screen or a laptop screen.

SUMMARY

Embodiments of the present disclosure relate to a backlight module, a display device and a driving method thereof.

At least one embodiment of the present disclosure provides a backlight module, the backlight module is applied to a display device, the display device includes a display panel; the backlight module includes: a micro control circuit, a selection control circuit, a backlight source, and a backlight driver chip; the backlight source includes a plurality of light-emitting components arranged in an array; the display panel includes a plurality of display sub-regions; the backlight source includes a primary viewing region and a subsidiary viewing region, each of the primary viewing region and the subsidiary viewing region includes at least one row of light-emitting components in the plurality of light-emitting components; the micro control circuit is configured to output a selection signal to the selection control circuit and output a control signal to the backlight driver chip after a scanning of one of the plurality of display sub-regions corresponding to the primary viewing region or the subsidiary viewing region is completed; the selection control circuit is configured to select the light-emitting components within the primary viewing region or the subsidiary viewing region according to the selection signal; and the backlight driver chip is configured to supply a drive current to the light-emitting components within the primary viewing region or the subsidiary viewing region that is selected according to the control signal.

In the backlight module provided by one or more embodiments of the present disclosure, the primary viewing region includes a plurality of light-emitting regions arranged laterally, and at least one channel of the backlight driver chip is configured to supply a drive current to the light-emitting components within each of the plurality of light-emitting regions.

In the backlight module provided by one or more embodiments of the present disclosure, the drive current supplied by the channel of the backlight driver chip to the light-emitting components in a corresponding light-emitting region, is determined by a grayscale value of pixels within a display partition corresponding to the light-emitting region.

In the backlight module provided by one or more embodiments of the present disclosure, a plurality of backlight driver chips are provided, the micro control circuit is connected with the selection control circuit, the selection control circuit is connected with the plurality of backlight driver chips, and the plurality of backlight driver chips are connected with the plurality of light-emitting components.

In the backlight module provided by one or more embodiments of the present disclosure, the plurality of backlight driver chips are arranged in an array, each of the plurality of backlight driver chips is connected with the light-emitting components within one light-emitting region, backlight driver chips of a same row are connected with a same terminal of the selection control circuit, backlight driver chips of different rows are connected with different terminals of the selection control circuit.

In the backlight module provided by one or more embodiments of the present disclosure, a selected time of the light-emitting components within the primary viewing region starts from a completion of a scanning of one of the plurality of the display sub-regions corresponding to the primary viewing region, to a beginning of a next scanning of the display sub-region corresponding to the primary viewing region.

In the backlight module provided by one or more embodiments of the present disclosure, the subsidiary viewing region includes a plurality of sub-partitions arranged longitudinally, the plurality of sub-partitions are located at two opposite sides of the primary viewing region.

In the backlight module provided by one or more embodiments of the present disclosure, each of the plurality of sub-partitions includes a plurality of light-emitting regions arranged laterally; the backlight driver chip is configured to supply a same drive current to the light-emitting components within at least two light-emitting regions of the sub-partition; the drive current supplied by a channel of the backlight driver chip to the light-emitting components within the at least two light-emitting regions of the sub-partition, is determined by a grayscale value of pixels within display partitions corresponding to the at least two light-emitting regions of the sub-partition.

In the backlight module provided by one or more embodiments of the present disclosure, a selected time of the light-emitting components within each of the sub-partitions starts from a completion of a scanning of one of the plurality of the display sub-regions corresponding to the sub-partition, to a beginning of a next scanning of the display sub-region corresponding to the sub-partition.

In the backlight module provided by one or more embodiments of the present disclosure, the micro control circuit is connected with the selection control circuit and the backlight driver chip, respectively; and the backlight driver chip is connected with the plurality of light-emitting components through the selection control circuit.

In the backlight module provided by one or more embodiments of the present disclosure, the subsidiary viewing region includes a plurality of sub-partitions arranged longitudinally, each of the plurality of sub-partitions includes a plurality of light-emitting regions arranged laterally; and the backlight driver chip is configured to supply a same drive current to the light-emitting components within at least two light-emitting regions of the sub-partition of the subsidiary viewing region.

In the backlight module provided by one or more embodiments of the present disclosure, a selected time of the light-emitting components within each of the sub-partitions starts from a completion of a scanning of one of the plurality of display sub-regions corresponding to the sub-partition, to a beginning of a scanning of one of the plurality of display sub-regions corresponding to the primary viewing region or a next sub-partition that is adjacent to the sub-partition; and a selected time of the light-emitting components within the primary viewing region starts from a completion of a scanning of one of plurality of display sub-regions corresponding to the primary viewing region, to a beginning of a scanning of one of the plurality display sub-regions corresponding to a next sub-partition that is adjacent to the primary viewing region.

At least one embodiment of the present disclosure further provides a display device, including any of the backlight modules as described above.

At least one embodiment of the present disclosure further provides a display device, which includes: a display panel, including a display region, the display region including a plurality of display sub-regions; and a backlight module, including a micro control circuit, a selection control circuit, a backlight source and a backlight driver chip; the backlight source includes a backlight region, the backlight region includes a plurality of backlight sub-regions, the plurality of backlight sub-regions are in a one-to-one correspondence with the plurality of display sub-regions, and each of the plurality of backlight sub-regions corresponds to one of the plurality of display sub-regions; the backlight source includes a plurality of light-emitting components arranged in an array; the backlight sub-region includes at least one row of light-emitting components in the plurality of light-emitting components; the micro control circuit is configured to output a selection signal to the selection control circuit and output a control signal to the backlight driver chip after a scanning of one of the plurality of display sub-regions corresponding to the backlight sub-region is completed; the selection control circuit is configured to select the light-emitting components within the backlight sub-region according to the selection signal; and the backlight driver chip is configured to supply a drive current to the light-emitting components within the backlight sub-region that is selected according to the control signal.

In the display device provided by one or more embodiments of the present disclosure, the display sub-region includes a plurality of display partitions arranged laterally, the backlight sub-region includes a plurality of light-emitting regions arranged laterally, the plurality of display sub-regions are arranged longitudinally, and the plurality of backlight sub-regions are arranged longitudinally; the display panel includes a base substrate, an orthographic projection of each of the backlight sub-regions on the base substrate coincides with an orthographic projection of a corresponding display sub-region on the base substrate; and an orthographic projection of each of the light-emitting regions on the base substrate coincides with an orthographic projection of a corresponding display partition on the base substrate.

In the display device provided by one or more embodiments of the present disclosure, a plurality of backlight driver chips are provided, the micro control circuit is connected with the selection control circuit, the selection control circuit is connected with the plurality of backlight driver chips, and the plurality of backlight driver chips are connected with the plurality of light-emitting components; the plurality of backlight driver chips are arranged in an array, each of the plurality of backlight driver chips is connected with the light-emitting components within one light-emitting region, backlight driver chips of a same row are connected with a same terminal of the selection control circuit, while backlight driver chips of different rows are connected with different terminals of the selection control circuit.

At least one embodiment of the present disclosure further provides a driving method of a display device, the display device includes: a display panel, including a display region, the display region including a plurality of display sub-regions; and a backlight module includes a micro control circuit, a selection control circuit, a backlight source and a backlight driver chip; the backlight source includes a backlight region, the backlight region includes a plurality of backlight sub-regions, the plurality of backlight sub-regions are in a one-to-one correspondence with the plurality of display sub-regions, and each of the plurality of backlight sub-regions corresponds to one of the plurality of display sub-regions; the backlight source includes a plurality of light-emitting components arranged in an array; the backlight sub-region includes at least one row of light-emitting components in the plurality of light-emitting components; the driving method including: outputting, by the micro control circuit, a selection signal to the selection control circuit and output a control signal to the backlight driver chip, after a scanning of one of the plurality of display sub-regions corresponding to the backlight sub-region is completed; selecting, by the selection control circuit, the light-emitting components within the backlight sub-region according to the selection signal; and supplying, by the backlight driver chip, a drive current to the light-emitting components within the backlight sub-region that is selected according to the control signal.

In the driving method provided by one or more embodiments of the present disclosure, a selected time of the light-emitting components within the backlight sub-region starts from a completion of a scanning of one of the plurality of display sub-regions corresponding to the backlight sub-region, to a beginning of a next scanning of the display sub-region corresponding to the backlight sub-region.

In the driving method provided by one or more embodiments of the present disclosure, the micro control circuit is connected with the selection control circuit and the backlight driver chip, respectively; the backlight driver chip is connected with the plurality of light-emitting components through the selection control circuit; a selected time of the light-emitting components within the backlight sub-region starts from a completion of a scanning of one of the plurality of display sub-regions corresponding to the backlight sub-region, to a beginning of a scanning of the display sub-region corresponding to a next backlight sub-region that is adjacent to the backlight sub-region.

In the driving method provided by one or more embodiments of the present disclosure, the plurality of backlight sub-regions are divided into a primary viewing region and a subsidiary viewing region, the primary viewing region includes at least one backlight sub-region, the subsidiary viewing region includes at least two backlight sub-regions; the at least two backlight sub-regions included in the subsidiary viewing region are located at opposite sides of the primary viewing region; the driving method further includes: supplying, by the backlight driver chip, a same drive current to the light-emitting components within at least two light-emitting regions within the backlight sub-region of the subsidiary viewing region.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure without constituting any limitation thereto.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the described object is changed, the relative position relationship may be changed accordingly.

A liquid crystal display device includes a liquid crystal display panel and a backlight module. The liquid crystal display panel includes a thin film transistor array substrate, an opposing substrate, and a liquid crystal layer arranged between the two substrates. For example, the array substrate is provided thereon with a pixel electrode, a data line and a gate line; and a common electrode may be located on a side of the opposing substrate that is close to the array substrate, or located on a side of the array substrate that is close to the opposing substrate. A working principle of the liquid crystal display device is applying drive voltages to the pixel electrode and the common electrode, respectively, to generate an electric field, so as to control a rotation of liquid crystal molecules in the liquid crystal layer of the liquid crystal display panel, so that an alignment direction of the liquid crystal molecules changes to change a transmittance of light emitted from the backlight module, to further generate an image and realize display.

Usually, a driving mode of a backlight module is simultaneously turning on and simultaneously turning off entire light-emitting components in a backlight source, and in an image display process, the light-emitting components in the backlight source are in a normal ON state, in which mode power consumption is relatively large, which is not favorable for energy saving.

In order to reduce power consumption of the liquid crystal display and improve a contrast, a dynamic backlight control method, that is, a local dimming method is usually applied. For example, the backlight module is divided into a plurality of light-emitting regions; each light-emitting region is provided with a plurality of independent control systems; and an ON/OFF and a brightness of light-emitting components of a corresponding light-emitting region are controlled according to brightness and darkness of respective positions of an image, which may enable a black color to be blacker and a white color to be whiter in the image, and render the image brighter and more vivid with a stronger contrast. Usually, after a display image is scanned entirely, a current determined by brightness and darkness of the image is simultaneously output to the light-emitting components in the respective light-emitting regions; although ON-time of the respective light-emitting components in the backlight source is reduced so that power consumption of the liquid crystal display device is lowered to a certain extent, yet the respective light-emitting components in the backlight source are all in an ON state within display time after scanning is completed, which still results in relatively high power consumption of the liquid crystal display device.

Figure 1A:
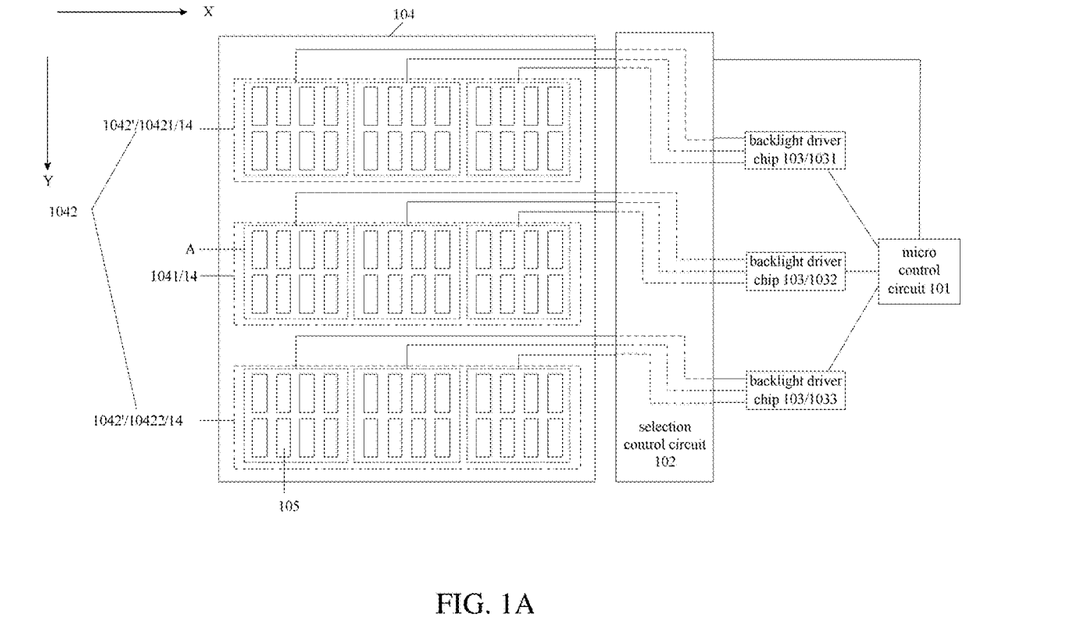
FIG. 1A is a structural diagram illustrating a backlight module provided by an embodiment of the present disclosure.

FIG. 1A is a structural diagram illustrating a backlight module provided by an embodiment of the present disclosure. As illustrated in FIG. 1A, the backlight module 100 is applied to a display device including a display panel, and the backlight module 100 includes: a micro control circuit 101, a selection control circuit 102, a plurality of backlight driver chips 103 (for example, a driver integrated circuits (driver IC)), and a backlight source 104. For example, the backlight source 104 includes a plurality of light-emitting components 105. For example, the plurality of light-emitting components 105 are arranged in an array, for further example, arranged in a matrix, without limited thereto. For example, the micro control circuit 101 may be a Microcontroller Unit (MCU), without limited thereto.

As illustrated in FIG. 1A, the backlight source 104 includes a plurality of backlight sub-regions 14; the plurality of backlight sub-regions include a primary viewing region 1041 and a subsidiary viewing region 1042; and each of the primary viewing region 1041 and the subsidiary viewing region 1042 include at least one row of light-emitting components 105 in the plurality of light-emitting components 105. That is, each backlight sub-region 14 includes at least one row of light-emitting components 105 in the plurality of light-emitting components 105. For example, as illustrated in FIG. 1A, the plurality of light-emitting components 105 are arranged in an array. FIG. 1A illustrates three backlight sub-regions 14, without limited thereto. For example, as illustrated in FIG. 1A, each backlight sub-region 14 includes a plurality of light-emitting regions A (a plurality of backlight partitions). For example, as illustrated in FIG. 1A, each backlight sub-region 14 extends in a first direction X, and the plurality of backlight sub-regions 14 are sequentially arranged in a second direction Y. For example, the first direction X is a row direction, and the second direction Y is a column direction. For example, an area of the primary viewing region 1041 is greater than or equal to an area of the subsidiary viewing region 1042, without limited thereto. For example, the primary viewing region 1041 includes at least one backlight sub-region 14, and the subsidiary viewing region 1042 includes at least one backlight sub-region 14. For further example, the primary viewing region 1041 is consisted of one backlight sub-region 14. For example, an area of the backlight sub-region 14 included in the primary viewing region 1041 is greater than an area of the backlight sub-region 14 included in the subsidiary viewing region 1042.

For example, as illustrated in FIG. 1A, the micro control circuit 101 is connected with the selection control circuit 102 and the backlight driver chip 103, respectively; and the backlight driver chip 103 is connected with the plurality of light-emitting components 105 through the selection control circuit 102.

Figure 1B:
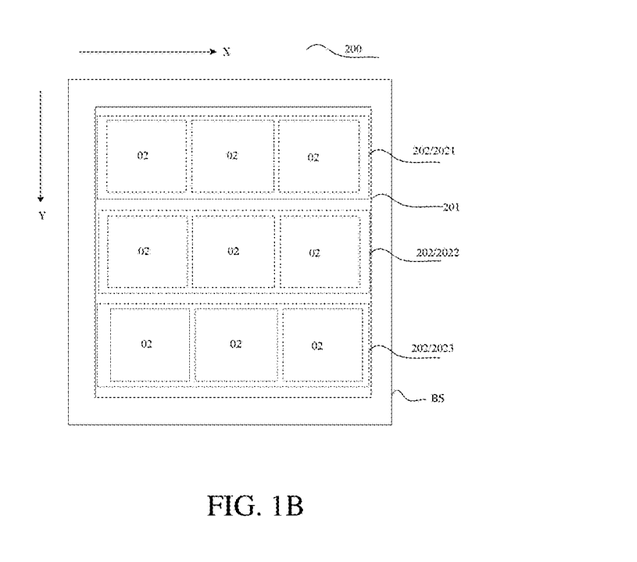
FIG. 1B is a structural diagram illustrating a display panel provided by an embodiment of the present disclosure.

FIG. 1B is a structural diagram illustrating a display panel provided by an embodiment of the present disclosure. For example, as illustrated in FIG. 1B, the display panel 200 includes a display region 201. As illustrated in FIG. 1B, the display region 201 of the display panel includes a plurality of display sub-regions 202. For example, the plurality of display sub-regions 202 are in a one-to-one correspondence with the plurality of backlight sub-regions 14. FIG. 1B illustrates three display sub-regions 202: a first display sub-region 2021, a second display sub-region 2022, and a third display sub-region 2023. For example, the number of display sub-regions 202 may be determined according to the number of the backlight sub-regions 14, without limited thereto. For example, as illustrated in FIG. 1B, each display sub-region 202 extends in the first direction X, and the plurality of display sub-regions 202 are sequentially arranged in the second direction Y. For example, in conjunction with FIG. 1A and FIG. 1B, the display panel 200 includes a base substrate BS, and an orthographic projection of each display sub-region 202 on the base substrate BS coincides with an orthographic projection of one backlight sub-region 14 on the base substrate BS, without limited thereto.

For example, as illustrated in FIG. 1B, each display sub-region 202 includes a plurality of display partitions 02. The plurality of display partitions 02 are arranged along the first direction. For example, in conjunction with FIG. 1A and FIG. 1B, one light-emitting region A in one backlight sub-region 14 corresponds to one display partition 02 in one display sub-region 202. For example, each display partition 02 corresponds to one light-emitting region A. For example, an orthographic projection of one display partition 02 on the base substrate coincides with an orthographic projection of one light-emitting region A on the base substrate, without limited thereto.

Figure 1C:
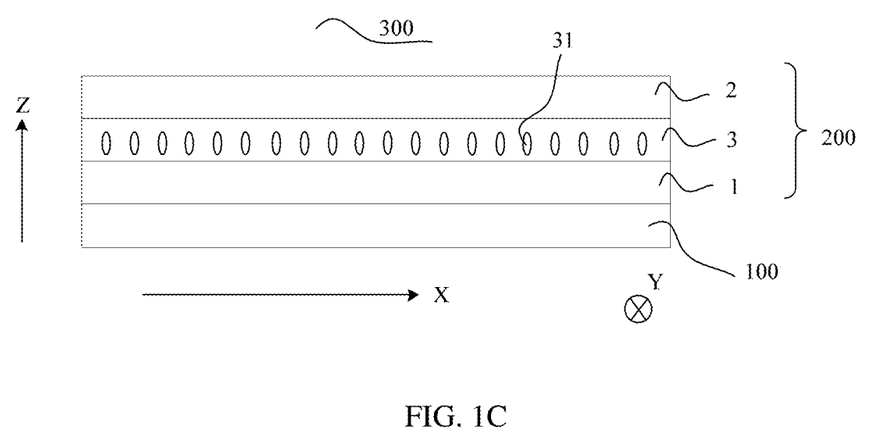
FIG. 1C is a structural diagram illustrating a display device provided by an embodiment of the present disclosure.

FIG. 1C is a structural diagram illustrating a display device provided by an embodiment of the present disclosure. As illustrated in FIG. 1C, the display device 300 includes a backlight module 100 and a display panel 200. The backlight module 100 and the display panel 200 are sequentially stacked in a third direction Z. As illustrated in FIG. 1C, the display panel 200 includes an array substrate 1, an opposing substrate 2, and a liquid crystal layer 3 located between the array substrate 1 and the opposing substrate 2. The liquid crystal layer 3 includes liquid crystal molecules 31. Light emitted from the backlight module 100 is irradiated onto the display panel 200.

Still referring to FIG. 1A, the backlight module includes a primary viewing region 1041 and a subsidiary viewing region 1042.

For example, the micro control circuit 101 is configured to output a selection signal to a selection control circuit 102 and output a control signal to a backlight driver chip 103, after a scanning of a display sub-region corresponding to the primary viewing region 1041 or the subsidiary viewing region 1042 is completed.

For example, the selection control circuit 102 is configured to select the light-emitting components within the primary viewing region 1041 or the subsidiary viewing region 1042 according to the received selection signal.

For example, the backlight driver chip 103 is configured to supply a drive current to the light-emitting components within the primary viewing region 1041 or the subsidiary viewing region 1042 that is selected according to the received control signal.

In the backlight module provided by the embodiment of the present disclosure, only the light-emitting components within the primary viewing region 1041 or the subsidiary viewing region 1042 that are selected are in an ON state, and remaining light-emitting components are in an OFF state; therefore, as compared with the technical solution that all light-emitting components of a backlight source are in an ON state in a related art, the backlight module provided by the embodiment of the present disclosure effectively reduces power consumption of the liquid crystal display device adopting a dynamic backlight sub-region control technology.

It should be explained that, in the backlight module provided by the embodiment of the present disclosure, a completion of a scanning of the display sub-region 202 corresponding to the primary viewing region 1041 or the subsidiary viewing region 1042 includes a process of writing data signals to pixels in the display sub-region 202, or includes a process of writing data signals to pixels in the display sub-region 202 and a process of liquid crystal response.

In addition, dashed lines in FIG. 1A refers to that drive currents output by different channels of the backlight driver chip 103 are correspondingly supplied to the light-emitting components of different light-emitting regions A within the primary viewing region 1041 or the subsidiary viewing region 1042 that is selected by the selection control circuit 102.

When specifically implemented, in the backlight module provided by the embodiment of the present disclosure, as illustrated in FIG. 1A, the primary viewing region 1041 includes a plurality of light-emitting regions A arranged in a first direction X (a lateral direction), and light-emitting components within each light-emitting region A are correspondingly supplied with a drive current by one channel of the backlight driver chip 103. The subsidiary viewing region 1042 includes a plurality of sub-partitions 1042' arranged longitudinally, and each sub-partition 1042' includes a plurality of light-emitting regions A arranged in the first direction X (the lateral direction). For example, the sub-partitions 1042' include sub-partitions that are provided at both sides of the primary viewing region, respectively. For example, the sub-partitions 1042' include sub-partitions 10421 and 10422 that are provided at both sides of the primary viewing region 1041, respectively. For example, the sub-partition 10421 is located at an upper side of the primary viewing region 1041, and the sub-partition 10422 is located at a lower side of the primary viewing region 1041. For example, the lateral direction is a row direction, and a longitudinal direction is a column direction, without limited thereto.

For example, light-emitting components in at least two light-emitting regions A of each sub-partition 1042' are supplied with a drive current by the same channel of the same backlight driver chip 103. For example, the backlight driver chip 103 is configured to supply the same drive current to light-emitting components in at least two light-emitting regions A of each sub-partition 1042'.

Usually, a content to be displayed in a middle region of a display region of a display image is relatively complicated, while a content to be displayed in a region other than the middle region of the display region, for example, a region above or below the middle region, is relatively simple, so the primary viewing region 1041 may correspond to the middle region of the display region, and the subsidiary viewing region 1042 may correspond to a region of the display region that is located at an upper or lower side of the middle region. That is to say, as illustrated in FIG. 1A, the primary viewing region 1041 may be located in the middle region of the backlight source 104, and the subsidiary viewing region 1042 may be located on the upper and lower sides of the primary viewing region 1041. For example, as illustrated in FIG. 1B, the second display sub-region 2022 is the middle region of the display region, the first display sub-region 2021 is a region above the second display sub-region 2022, and the third display sub-region 2023 is a region below the second display sub-region 2022. However, in actual application, a position of the primary viewing region 1041 is not limited to the middle region of the backlight source 104, and may be other regions, without limited herein. In order to facilitate description of the technical solution provided by the embodiment of the present disclosure, the embodiments will be described below with reference to the case where the primary viewing region 1041 is located in the middle region, and the subsidiary viewing region 1042 is located on the upper and lower sides of the primary viewing region 1041, by way of example.

Figure 2:
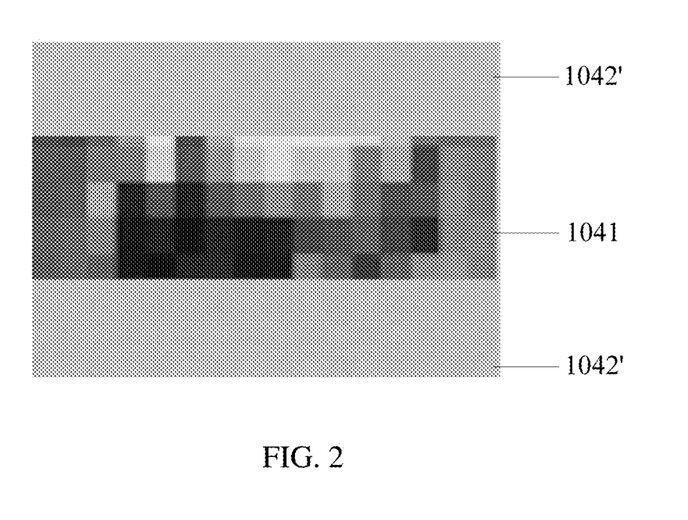
FIG. 2 is a diagram illustrating a display brightness effect of a display image corresponding to the backlight module illustrated in FIG. 1A.

FIG. 2 is a diagram illustrating a display brightness effect of the display image corresponding to the backlight module illustrated in FIG. 1A. In order to improve the display effect of the display image and further reduce power consumption at the same time, in the backlight module provided by the embodiment of the present disclosure, as illustrated in FIG. 2, a drive current supplied by each channel of the backlight driver chip 103 to the light-emitting components of a corresponding light-emitting region A within the primary viewing region 1041 may be determined by a grayscale value of pixels within display partitions 02 of the display region corresponding to the light-emitting regions A. For example, grayscale data of pixels within a display partition corresponding to each light-emitting region A may be processed by using an algorithm of an average grayscale or a maximum grayscale, etc., to obtain a corresponding relationship between the drive current and the grayscale value of the display partition corresponding to the light-emitting region A, so as to determine the drive current required for the light-emitting components of the light-emitting region A, so that the light-emitting region A varies in brightness according to a content of the display image that correspond to the display partition. Of course, it may also be determined by other relevant factors of the display image of the display partition corresponding to the light-emitting region A, without limited herein. A drive current supplied by the channel of the backlight driver chip 103 to the light-emitting components within at least two light-emitting regions A of a sub-partition 1042' of the subsidiary viewing region 1042 are determined by a grayscale value of pixels within display partitions corresponding to the at least two light-emitting regions A of the sub-partition 1042', that is, different from drive current control performed on the light-emitting components of the primary viewing region 1041 in units of a light-emitting region A, with respect to the light-emitting components within the sub-partition 1042' of the subsidiary viewing region 1042, a plurality of light-emitting regions A may be considered as a group, and the drive current is calculated and controlled in units of a group, to control a brightness in a simple manner and simplify a driving mode. For example, grayscale data of pixels within display partitions corresponding to each group of light-emitting regions A (at least including two light-emitting regions A) of each sub-partition 1042' may be processed by using an algorithm of an average grayscale or a maximum grayscale, etc., to obtain a corresponding relationship between the drive current and the grayscale value of the display partition, so as to determine the drive current required for the light-emitting components of the group of light-emitting regions A, which renders an equal brightness of respective light-emitting regions A within each group in one sub-partition 1042'. For example, when the respective light-emitting regions A of one sub-partition 1042' only constitute one group, an overall brightness of the sub-partition 1042' may be simultaneously changed; and of course, it may also be determined by other relevant factors of the display image of the display sub-region corresponding to the sub-partition 1042', without limited herein.

A complicated brightness control method of partitioning according to the display content is used in the light-emitting components within the primary viewing region 1041 corresponding to the middle region of the display region, while a simple brightness control method is used in the light-emitting components within the subsidiary viewing region 1042 corresponding to the upper and lower sides of the display region, so a better display effect is achieved with respect to a detailed content of a portion of the display image to be displayed in the middle region of the display region that needs to be displayed.

In a conventional technology, when a display image of a display sub-region corresponding to a subsidiary viewing region is relatively bright, usually a drive current may be automatically increased by using a local dimming technology, which is likely to cause a problem of excessive power consumption. However, in the backlight module/the display device provided by the embodiment of the present disclosure, even if a display image of the display sub-region corresponding to the subsidiary viewing region 1042 is relatively bright, the drive current for driving the light-emitting components within the subsidiary viewing region 1042 is constant, which avoids the problem of excessively high power consumption, so that power consumption can be reduced.

It should be explained that, in the backlight module provided by the embodiment of the present disclosure, only the case where the light-emitting components within the primary viewing region 1041 and the light-emitting components within each sub-partition 1042' are respectively supplied with drive currents by a plurality of channels of one corresponding backlight driver chip 103 is exemplarily provided. It can be understood that, in the case where there are more light-emitting components within the primary viewing region 1041 and the sub-partition 1042', when the number of channels of one backlight driver chip 103 is insufficient to supply drive currents to all the light-emitting components within the primary viewing region 1041 or the sub-partition 1042', a plurality of backlight driver chips 103 may be used to supply the drive currents to the light-emitting components within the primary viewing region 1041 and the sub-partition 1042', respectively. For example, the backlight driver chip 103 supplies drive currents such that different light-emitting regions A included in the primary viewing region 1041 vary in brightness according to contents of the corresponding display image, and at least two light-emitting regions A within the same sub-partition 1042' are simultaneously changed in brightness.

Figure 3A:
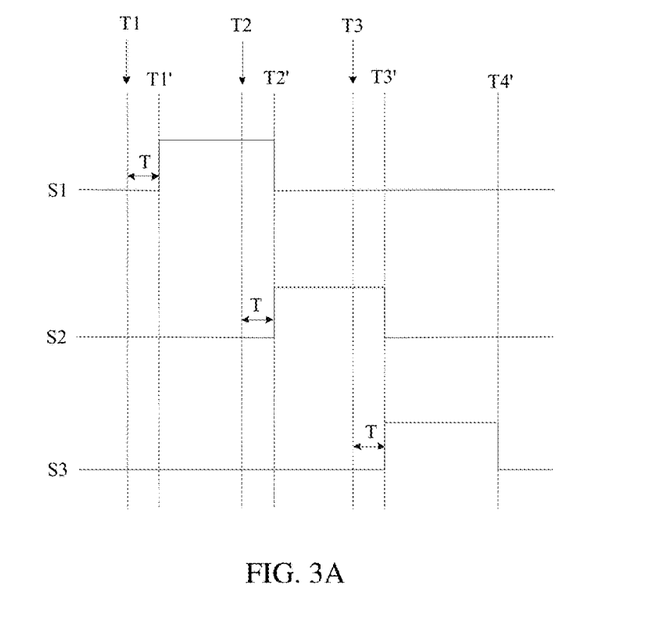
FIG. 3A is a diagram illustrating a waveform of a selection signal in the backlight module illustrated in FIG. 1A.

FIG. 3A is a diagram illustrating a waveform of a selection signal of a display module provided by an embodiment of the present disclosure. S1 is a selection signal that is provided by the selection control circuit 102 to select the light-emitting components within the sub-partition 1042' located at an upper side of the primary viewing region 1041, after a scanning of the display sub-region 2021 corresponding to the sub-partition 1042' is completed; S2 is a selection signal that is provided by the selection control circuit 102 to select the light-emitting components within the primary viewing region 1041, after a scanning of the display sub-region 2022 corresponding to the primary viewing region 1041 is completed; and S3 is a selection signal that is provided by the selection control circuit 102 to select the light-emitting components within the sub-partition 1042' located at a lower side of the primary viewing region 1041, after a scanning of the display sub-region 2023 corresponding to the sub-partition 1042' is completed. As can be seen from FIG. 3A, a selected time of the light-emitting components within the sub-partition 1042' located at an upper side of the primary viewing region 1041, starts from a completion of a scanning of the display sub-region 2021 corresponding to the sub-partition 1042' (i.e., the completion of the scanning further includes a liquid crystal response time T after a moment T1 at which data signal writing ends), to a completion of a scanning of the display sub-region 2022 corresponding to the primary viewing region 1041 adjacent to the sub-partition 1042' (i.e., the completion of the scanning further includes a liquid crystal response time T after a moment T2 at which data signal writing ends); a selected time of the light-emitting components within the primary viewing region 1041, starts from a completion of a scanning of the display sub-region 2022 corresponding to the primary viewing region 1041 (i.e., the completion of the scanning further includes a liquid crystal response time T after a moment T2 at which data signal writing ends), to a completion of a scanning of the display sub-region 2023 corresponding to the sub-partition 1042' located at a lower side of the primary viewing region 1041 (i.e., the completion of the scanning further includes a liquid crystal response time T after a moment T3 at which data signal writing ends); and a selected time of the light-emitting components within the sub-partition 1042' located at a lower side of the primary viewing region 1041, starts from a completion of a scanning of the display sub-region 2023 corresponding to the sub-partition 1042' (i.e., the completion of the scanning further includes a liquid crystal response time T after a moment T3 at which data signal writing ends), to a completion of a scanning of the display sub-region 2021 corresponding to a next sub-partition 1042' adjacent to the sub-partition 1042'.

For example, in the case where the same backlight driver chip 103 is used to supply a drive current to light-emitting components within a plurality of sub-partitions 1042' and the primary viewing region 1041, in order not to affect normal display of the display image, a value of the drive current supplied by the backlight driver chip 103 should be larger than a value of a drive current supplied only to one sub-partition 1042' or only to the primary viewing region 1041, so that an effect of persistence of vision is generated due to a high brightness, a black image would not be viewed, and a normal viewing effect is achieved.

In addition, a brightness of light-emitting components within respective light-emitting regions A of the sub-partitions 1042' may be simply controlled, for example, light-emitting components within a plurality of light-emitting regions A of the same sub-partition 1042' have the same drive current; while light-emitting components within respective light-emitting regions A of the primary viewing region 1041 may be complicatedly controlled, for example, light-emitting components within each light-emitting region A have a drive current separately supplied, and a value of the drive current separately supplied may be determined by a content of the display image that corresponds to the respective light-emitting regions A.

Figure 3B:
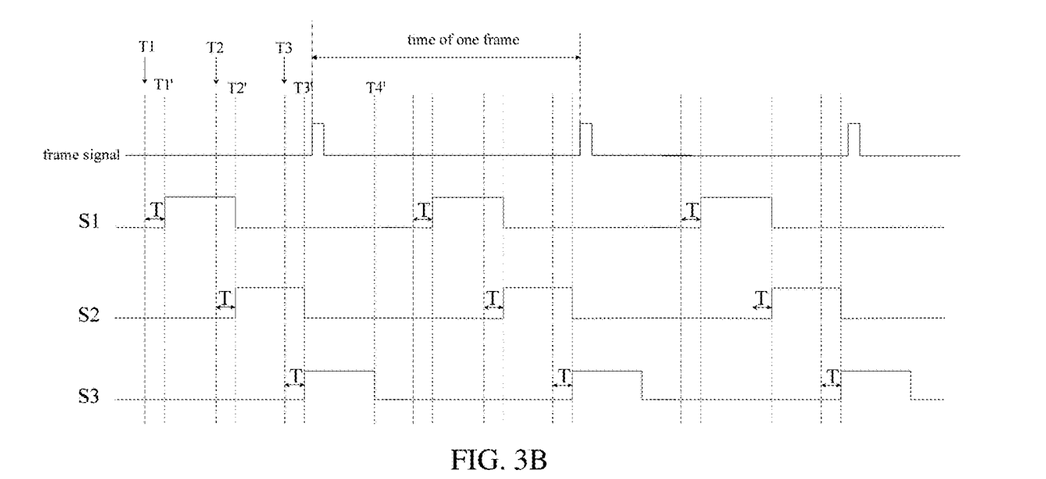
FIG. 3B is a diagram illustrating a waveform of a selection signal of a display module provided by the embodiment of the present disclosure.

FIG. 3B is a diagram illustrating a waveform of the selection signal of the display module provided by an embodiment of the present disclosure. FIG. 3B illustrates a diagram of a waveform of the selection signal within a time of at least one frame. FIG. 3A may be a portion of FIG. 3B.

For example, the waveform diagram of the selection signal of the backlight module 100 illustrated in FIG. 1A is as illustrated in FIG. 3A or FIG. 3B. For example, within a time from a moment T1' to a moment T2', a backlight driver chip 1031 controls light-emitting components within the sub-partition 10421 to be in an ON state, while light-emitting components within the primary viewing region 1041 and the sub-partition 10422 to be in an OFF state. Correspondingly, within a time from a moment T2' to a moment T3', a backlight driver chip 1032 controls light-emitting components within the primary viewing region 1041 to be in an ON state, and light-emitting components within the sub-partition 10421 and the sub-partition 10422 to be in an OFF state; and within a time from a moment T3' to a moment T4', the backlight driver chip 1032 controls light-emitting components within the sub-partition 10422 to be in an ON state, and light-emitting components within the primary viewing region 1041 and the sub-partition 10421 to be in an OFF state.

For example, within a selection time of each backlight sub-region 14, light-emitting components within each backlight sub-region 14 may be simultaneously turned on, or sequentially turned on from left to right according to light-emitting regions A, and a mode of turning on light-emitting components within each backlight sub-region 14 is not limited in the embodiment of the present disclosure.

In the embodiment of the present disclosure, the number of light-emitting regions A included by each backlight sub-region 14 is not limited to that illustrated in the diagram, the number of primary regions 1041 is not limited to that illustrated in the diagram, and the number of sub-partitions 1042' is not limited to that illustrated in the diagram, which can be determined as needed.

Figure 4:
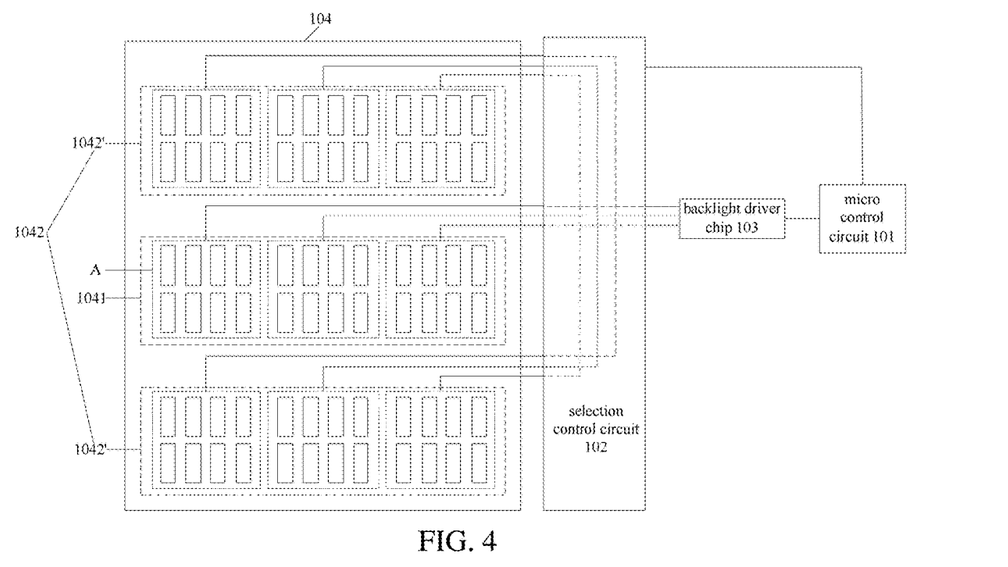
FIG. 4 is a structural diagram illustrating a backlight module provided by another embodiment of the present disclosure.

FIG. 4 is a backlight module provided by another embodiment of the present disclosure. As can be seen from FIG. 4, in the backlight module provided by this embodiment, a subsidiary viewing region 1042 includes a plurality of sub-partitions 1042' arranged longitudinally, and each sub-partition 1042' includes a plurality of light-emitting regions A arranged laterally.

As illustrated in FIG. 4, the backlight module provided by this embodiment differs from the backlight module provided by the above-described embodiment only in the number of backlight driver chips 103 required and a specific working process thereof, so only different parts will be introduced below, and for the same parts, the above-described embodiment may be referred to, which will not be repeated here.

For example, as illustrated in FIG. 4, light-emitting components within light-emitting regions A arranged longitudinally located in the sub-partitions 1042' and the primary viewing region 1041 may be supplied with a drive current by the same channel of the same backlight driver chip 1031, without limited thereto.

It can be known by comparison that, the number of backlight driver chips 103 in the backlight module provided by this embodiment is smaller than the number of backlight driver chips 103 in the backlight module provided by the embodiment illustrated in FIG. 1A, and therefore, product cost can be reduced.

However, because light-emitting regions A arranged longitudinally belonging to different sub-partitions 1042' and the primary viewing region 1041 are controlled by the same channel of the same backlight driver chip 103, in order that light-emitting regions A arranged longitudinally belonging to each sub-partition 1042' and the primary viewing region 1041 can all work normally, in the backlight module provided by this embodiment, a selected time of the light-emitting components within each sub-partition 1042' starts from a completion of a scanning of a display sub-region corresponding to the sub-partition 1042', to a beginning of a scanning of a display sub-region corresponding to a next sub-partition 1042' or the primary viewing region 1041 adjacent to the sub-partition 1042'.

For example, a selected time of the light-emitting components within the primary viewing region 1041 starts from a completion of a scanning of a display sub-region 2022 corresponding to the primary viewing region 1041, to a beginning of a scanning of a display sub-region 2023 corresponding to a next sub-partition 1042' adjacent to the primary viewing region 1041.

Figure 5:
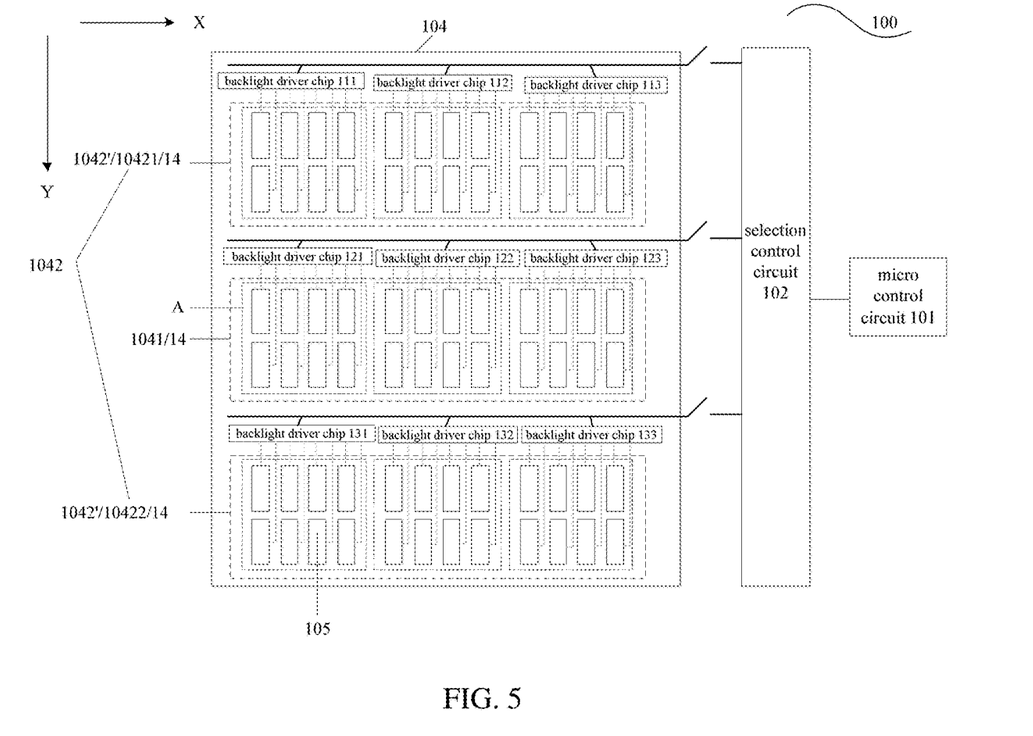
FIG. 5 is a structural diagram illustrating a backlight module provided by still another embodiment of the present disclosure.

FIG. 5 is a structural diagram illustrating a backlight module provided by another embodiment of the present disclosure. As illustrated in FIG. 5, a micro control circuit 101 is connected with a selection control circuit 102, and the selection control circuit 102 is connected with a backlight driver chip corresponding to each backlight sub-region 14. For example, each backlight sub-region 14 corresponds to at least one backlight driver chip.

As illustrated in FIG. 5, a plurality of channels of each backlight driver chip are respectively connected with a plurality of light-emitting components 105 in a light-emitting regions corresponding thereto, to separately control each light-emitting component 105, without limited thereto. In other embodiment, one channel of a backlight driver chip may also be connected with several light-emitting components 105. Each backlight sub-region 14 in FIG. 5 corresponds to three backlight driver chips. A sub-partition 10421 corresponds to a backlight driver chip 111, a backlight driver chip 112 and a backlight driver chip 113; a sub-partition 10422 corresponds to a backlight driver chip 131, a backlight driver chip 132 and a backlight driver chip 133; a primary viewing region 1041 corresponds to a backlight driver chip 121, a backlight driver chip 122 and a backlight driver chip 123. In other embodiment, each backlight sub-region 14 may also correspond to other numbers of backlight driver chips, for example, correspond one backlight driver chip, two or more than three backlight driver chips.

FIG. 5 illustrates that one channel of each backlight driver chip is connected with one light-emitting component 105, without limited thereto. In other embodiment, one channel of each backlight driver chip may be connected with several light-emitting components 105. For example, one channel of a backlight driver chip may provide a signal to at least one of a cathode and an anode of a light-emitting component 105, to control ON/OFF and a brightness of the light-emitting component 105.

For example, in FIG. 5, the micro control circuit 101 is connected with the backlight driver chip, which is not illustrated in FIG. 5 for the sake of clarity. The micro control circuit 101 can control light-emitting components within each backlight sub-region or each light-emitting region according to display data of each display sub-region, for example, control at least one of ON/OFF and a brightness of the light-emitting component.

For example, in some embodiments, as illustrated in FIG. 5, a plurality of backlight driver chips are provided, a micro control circuit 101 is connected with a selection control circuit 102, the selection control circuit 102 is connected with the plurality of backlight driver chips, and the plurality of backlight driver chips are connected with a plurality of light-emitting components 102.

For example, in some embodiments, as illustrated in FIG. 5, a plurality of backlight driver chips are arranged in an array, and backlight driver chips of the same row are connected with the same terminal of a selection control circuit, while backlight driver chips of different rows are connected with different terminals of the selection control circuit. For example, each of the plurality of backlight driver chips is connected with the light-emitting components within one light-emitting region.

For example, as illustrated in FIG. 5, the micro control circuit 101 is configured to output a selection signal to the selection control circuit 102, and output a control signal to the backlight driver chip 103, after a scanning of a display sub-region corresponding to a primary viewing region 1041 or a subsidiary viewing region 1042 is completed. For example, the selection control circuit 102 is configured to select the light-emitting components within the primary viewing region 1041 or the subsidiary viewing region 1042 according to the received selection signal. For example, the backlight driver chip 103 is configured to supply a drive current to the light-emitting components within the primary viewing region 1041 or the subsidiary viewing region 1042 that is selected according to the received control signal.

Figure 6A:
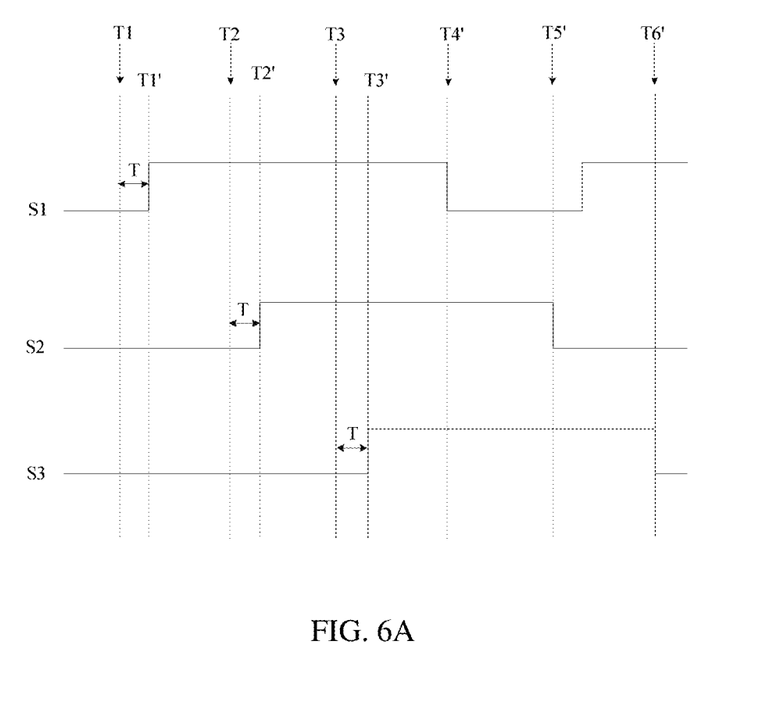
FIG. 6A is a diagram illustrating a waveform of a selection signal in the backlight module illustrated in FIG. 5.

FIG. 6A is a diagram illustrating a waveform of a selection signal in the backlight module illustrated in FIG. 5. In the backlight module provided by the embodiment of the present disclosure, light-emitting components within the primary viewing region 1041 and light-emitting components within sub-partitions 1042' on an upper and lower sides are respectively supplied with drive currents by different backlight driver chips 103; in order to facilitate stability of a display image, a selected time of the light-emitting components within the primary viewing region 1041 may be made to start from a completion of a scanning of a display sub-region corresponding to the primary viewing region 1041, to a beginning of a next scanning of the display sub-region corresponding to the primary viewing region 1041; a selected time of the light-emitting components within each sub-partition 1042' may be made to start from a completion of a scanning of a display sub-region corresponding to the sub-partition 1042', to a beginning of a next scanning of the display sub-region corresponding to the sub-partition 1042'. As compared with the embodiment illustrated in FIG. 1A, an ON-time of each backlight sub-region according to the embodiment illustrated in FIG. 5 is extended, which facilitates a stability of a display image. At the same time, a plurality of backlight sub-regions are sequentially turned on, which is favorable for reducing power consumption of the backlight module.

For example, as illustrated in FIG. 6A, S1 is a selection signal provided by the selection control circuit 102 to select the light-emitting components within the sub-partition 10421 located at an upper side of the primary viewing region 1041, after a scanning of a display sub-region 2021 corresponding to the sub-partition 10421 is completed; S2 is a selection signal provided by the selection control circuit 102 to select the light-emitting components within the primary viewing region 1041, after a scanning of a display sub-region 2022 corresponding to the primary viewing region 1041 is completed; and S3 is a selection signal provided by the selection control circuit 102 to select the light-emitting components within the sub-partition 10422 located at a lower side of the primary viewing region 1041, after a scanning of a display sub-region 2023 corresponding to the sub-partition 10422 is completed. As can be seen from FIG. 6A, a selected time of the light-emitting components within the sub-partition 10421 located at an upper side of the primary viewing region 1041, starts from a completion of a scanning of the display sub-region 2021 corresponding to the sub-partition 10421 (i.e., the completion of the scanning further includes a liquid crystal response time T after a moment T1 at which data signal writing to the display sub-region 2021 ends), to a beginning (i.e., a moment T4' at which data signal writing to the display sub-region 2021 begins) of a next scanning of the display sub-region 2021 corresponding to the sub-partition 10421; a selected time of the light-emitting components within the primary viewing region 1041, starts from a completion of a scanning of the display sub-region 2022 corresponding to the primary viewing region 1041 (i.e., the completion of the scanning further includes a liquid crystal response time T after a moment T2 at which data signal writing ends), to a beginning (i.e., a moment T5' at which data signal writing to the display sub-region 2022 begins) of a next scanning of the display sub-region 2022 corresponding to the primary viewing region 1041; and a selected time of the light-emitting components within the sub-partition 10422 located at a lower side of the primary viewing region 1041, starts from a completion of a scanning of the display sub-region 2023 corresponding to the sub-partition 10422 (i.e., the completion of the scanning further includes a liquid crystal response time T after a moment T3 at which data signal writing ends), to a beginning (i.e., a moment T6' at which data signal writing to the display sub-region 2023 begins) of a next scanning of the display sub-region 2023 corresponding to the sub-partition 10422.

For example, in the backlight module provided by the embodiment of the present disclosure, for convenience of control and simplicity of the control circuit, light-emitting components within respective light-emitting regions A included by the sub-partition 1042' have the same serial-parallel connection mode. For convenience of arrangement of light-emitting components, the serial-parallel connection mode of light-emitting components within the respective light-emitting regions A included by the sub-partition 1042' may be the same as a serial-parallel connection mode of light-emitting components within respective light-emitting regions A included by the primary viewing region 1041. Furthermore, in consideration that a position of the primary viewing region 1041 may have been determined at design time, or may also change in real time in certain implementation scenarios: if the position of the primary viewing region 1041 changes in real time, then for convenience of control, the series-parallel connection mode of light-emitting components within the respective light-emitting regions A included by the sub-partition 1042' may be arranged to be the same as the serial-parallel connection mode of the light-emitting components within the respective light-emitting regions A included by the primary viewing region 1041; and if the position of the primary viewing region 1041 has been determined at design time, then, in order to implement independent control of the light-emitting components within the respective light-emitting regions A included by the primary viewing region 1041, the series-parallel connection mode of the light-emitting components within the respective light-emitting regions A included by the sub-partition 1042' is usually arranged to be different from the serial-parallel connection mode of the light-emitting components within the respective light-emitting regions A included by the primary viewing region 1041.

Figure 6B:
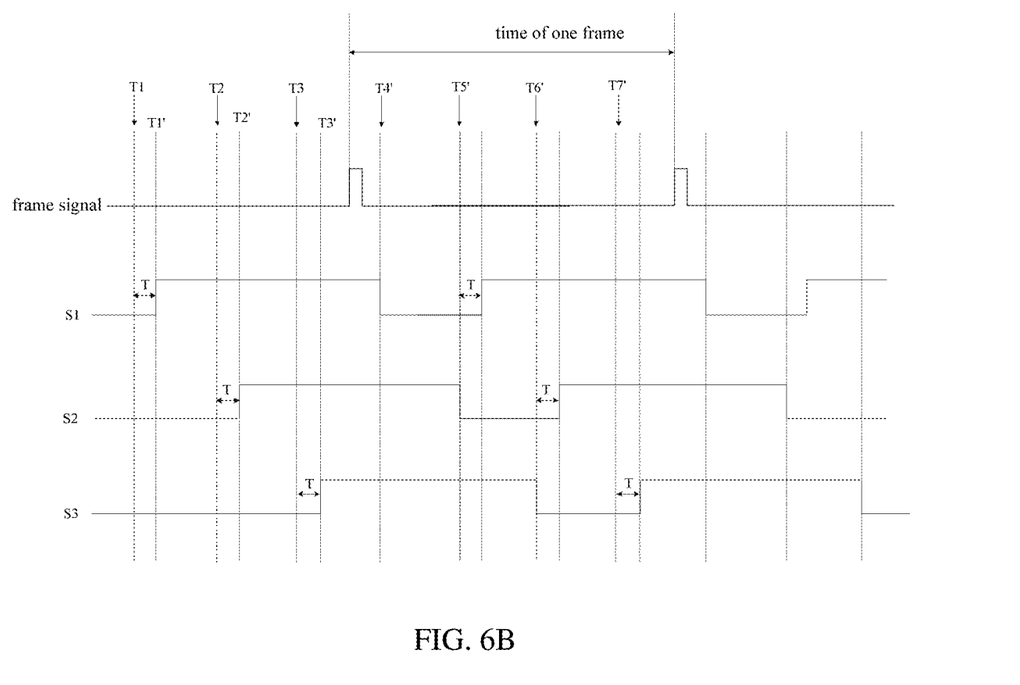
FIG. 6B is a diagram illustrating a waveform of a selection signal in the backlight module illustrated in FIG. 5.

FIG. 6B is a diagram illustrating a waveform of the selection signal in the backlight module illustrated in FIG. 5. FIG. 6B illustrates a diagram of the waveform of the selection signal within a time of at least one frame. FIG. 6A may be a portion of FIG. 6B.

As illustrated in FIG. 6A and FIG. 6B, a moment T1 is a moment at which a scanning of the display sub-region 2021 is completed; a time from the moment T1 to a moment T1' is a liquid crystal response time; within a time from the moment T1' to a moment T4', the light-emitting components within the sub-partition 10421 are selected; and the time from the moment T4' to a moment T5' is a scanning time, that is, a data writing time, of the display sub-region 2021. Correspondingly, a moment T2 is a moment at which a scanning of the display sub-region 2022 is completed; a time from the moment T2 to a moment T2' is a liquid crystal response time; within a time from the moment T2' to a moment T5', the light-emitting components within the primary viewing region 1041 are selected; and the time from the moment T5' to a moment T6' is a scanning time, that is, a data writing time, of the display sub-region 2022. Correspondingly, a moment T3 is a moment at which a scanning of the display sub-region 2023 is completed; a time from the moment T3 to a moment T3' is a liquid crystal response time; within a time from the moment T3' to a moment T6', the light-emitting components within the sub-partition 10422 are selected; and a time from the moment T6' to a moment T7' (only illustrated in FIG. 6B) is a scanning time, that is, a data writing time, of the display sub-region 2023.

For example, the selection control circuit 102 may include a multiplexer, without limited thereto. For example, the selection control circuit 102 includes a plurality of thin film transistors, without limited thereto. For example, the selection control circuit 102 may implement a function required through program settings.

Based on the same inventive concept, another embodiment of the present disclosure provides a display device, including a display panel and the above-described backlight module provided by any one embodiment of the present disclosure; the display device may be a product or component having a display function, such as a mobile phone, a tablet personal computer, a television, a display screen, a laptop, a digital camera, a navigator, a smart watch, a fitness wristband, a personal digital assistant, and a self-service deposit/withdrawal machine. With respect to other components of the display device that should all be presented by those ordinarily skill in the art, which will not be repeated here, and should not be construed as a limitation to the present disclosure. The display device can be implemented with reference to the backlight module provided by the embodiments as described above, and the description thereof will not be repeated here.

In the backlight module and the display device provided by the embodiments of the present disclosure, the backlight module includes: the micro control circuit, the selection control circuit, the plurality of backlight driver chips, and the backlight source composed of the plurality of light-emitting components arranged in an array; the backlight source includes a primary viewing region and a subsidiary viewing region, each of the primary viewing region and the subsidiary viewing region includes at least one row of light-emitting components; the micro control circuit is configured to output the selection signal to the selection control circuit, and output the control signal to the backlight driver chip, after a scanning of the display region of the display panel that corresponds to the primary viewing region or the subsidiary viewing region is completed; the selection control circuit is configured to select the light-emitting components within the primary viewing region or the subsidiary viewing region according to the received selection signal; and the backlight driver chip is configured to supply a drive current to the light-emitting components within the primary viewing region or the subsidiary viewing region that is selected according to the received control signal.

In the backlight module provided by the embodiment of the present disclosure, only the light-emitting components being selected are in an ON state, while a remaining light-emitting components are in an OFF state; therefore, as compared with the technical solution that all the light-emitting components of the backlight source are in an ON state in the related art, the backlight module provided by the embodiment of the present disclosure effectively reduces power consumption of the liquid crystal display device by using the dynamic backlight sub-region control technology.

For example, in an embodiment of the present disclosure, the display region of the display panel may include a plurality of display units, and the plurality of display units may be arranged in an array, and each row of display units is connected to the same gate line, and each of the gate lines extends along the horizontal direction. The plurality of gate lines are arranged in a longitudinal direction, and the plurality of gate lines are scanned in a progressive scan manner to display one frame of the image. For example, each display unit includes a thin film transistor (TFT), a pixel electrode and a common electrode, a gate electrode of the TFT is connected to the gate line, a drain electrode of the TFT is connected to the pixel electrode, a source electrode of the TFT is connected to a data line, a pixel electrode and a common electrode can be input with different voltages to generate an electric field to drive the liquid crystal molecules to rotate to achieve display. The gate line is configured to be input with a gate signal, and the data line is configured to be input with a data signal. When the gate line is selected (gated) to turn on the TFT, the data signal on the data line can be transmitted to the pixel electrode through the TFT. A reference voltage can be supplied to the common electrode, and the reference voltage can be a constant voltage.

At least one embodiment of the present disclosure further provides a driving method of a display device, the display device includes: a display panel, including a display region, the display region including a plurality of display sub-regions; and a backlight module includes a micro control circuit, a selection control circuit, a backlight source and a backlight driver chip; the backlight source includes a backlight region, the backlight region includes a plurality of backlight sub-regions, the plurality of backlight sub-regions are in a one-to-one correspondence with the plurality of display sub-regions, and each of the plurality of backlight sub-regions corresponds to one of the plurality of display sub-regions; the backlight source includes a plurality of light-emitting components arranged in an array; the backlight sub-region includes at least one row of light-emitting components in the plurality of light-emitting components; the driving method including: outputting, by the micro control circuit, a selection signal to the selection control circuit and output a control signal to the backlight driver chip, after a scanning of one of the plurality of display sub-regions corresponding to the backlight sub-region is completed; selecting, by the selection control circuit, the light-emitting components within the backlight sub-region according to the selection signal; and supplying, by the backlight driver chip, a drive current to the light-emitting components within the backlight sub-region that is selected according to the control signal.

In the driving method provided by one or more embodiments of the present disclosure, a selected time of the light-emitting components within the backlight sub-region starts from a completion of a scanning of one of the plurality of display sub-regions corresponding to the backlight sub-region, to a beginning of a next scanning of the display sub-region corresponding to the backlight sub-region.

In the driving method provided by one or more embodiments of the present disclosure, the micro control circuit is connected with the selection control circuit and the backlight driver chip, respectively; the backlight driver chip is connected with the plurality of light-emitting components through the selection control circuit; a selected time of the light-emitting components within the backlight sub-region starts from a completion of a scanning of one of the plurality of display sub-regions corresponding to the backlight sub-region, to a beginning of a scanning of the display sub-region corresponding to a next backlight sub-region that is adjacent to the backlight sub-region.

In the driving method provided by one or more embodiments of the present disclosure, the plurality of backlight sub-regions are divided into a primary viewing region and a subsidiary viewing region, the primary viewing region includes at least one backlight sub-region, the subsidiary viewing region includes at least two backlight sub-regions; the at least two backlight sub-regions included in the subsidiary viewing region are located at opposite sides of the primary viewing region; the driving method further includes: supplying, by the backlight driver chip, a same drive current to the light-emitting components within at least two light-emitting regions within the backlight sub-region of the subsidiary viewing region.

At least one embodiment of the present disclosure further provides a driving method of a display device, the display device includes: a display panel, including a display region, the display region including a plurality of display sub-regions; and a backlight module includes a micro control circuit, a selection control circuit, a backlight source and a backlight driver chip; the backlight source includes a backlight region, the backlight region includes a plurality of backlight sub-regions, the plurality of backlight sub-regions are in a one-to-one correspondence with the plurality of display sub-regions, and each of the plurality of backlight sub-regions corresponds to one of the plurality of display sub-regions; the backlight source includes a plurality of light-emitting components arranged in an array; the backlight sub-region includes at least one row of light-emitting components in the plurality of light-emitting components; the driving method including: outputting, by the micro control circuit, a selection signal to the selection control circuit and output a control signal to the backlight driver chip, after a scanning of one of the plurality of display sub-regions corresponding to the backlight sub-region is completed; selecting, by the selection control circuit, the light-emitting components within the backlight sub-region according to the selection signal; and supplying, by the backlight driver chip, a drive current to the light-emitting components within the backlight sub-region that is selected according to the control signal.

In the driving method provided by one or more embodiments of the present disclosure, a selected time of the light-emitting components within the backlight sub-region starts from a completion of a scanning of one of the plurality of display sub-regions corresponding to the backlight sub-region, to a beginning of a next scanning of the display sub-region corresponding to the backlight sub-region.

In the driving method provided by one or more embodiments of the present disclosure, the micro control circuit is connected with the selection control circuit and the backlight driver chip, respectively; the backlight driver chip is connected with the plurality of light-emitting components through the selection control circuit; a selected time of the light-emitting components within the backlight sub-region starts from a completion of a scanning of one of the plurality of display sub-regions corresponding to the backlight sub-region, to a beginning of a scanning of the display sub-region corresponding to a next backlight sub-region that is adjacent to the backlight sub-region.

In the driving method provided by one or more embodiments of the present disclosure, the plurality of backlight sub-regions are divided into a primary viewing region and a subsidiary viewing region, the primary viewing region includes at least one backlight sub-region, the subsidiary viewing region includes at least two backlight sub-regions; the at least two backlight sub-regions included in the subsidiary viewing region are located at opposite sides of the primary viewing region; the driving method further includes: supplying, by the backlight driver chip, a same drive current to the light-emitting components within at least two light-emitting regions within the backlight sub-region of the subsidiary viewing region.

In the embodiments of the present disclosure, the display device and the driving method can be referred to each other.

The above are only specific implementations of the present disclosure, and the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A backlight module, the backlight module being applied to a display device, the display device comprising a display panel; wherein the backlight module comprises: a micro control circuit, a selection control circuit, a backlight source, and a backlight driver chip; the backlight source comprises a plurality of light-emitting components arranged in an array;

the display panel comprises a plurality of display sub-regions; the backlight source comprises a primary viewing region and a subsidiary viewing region, each of the primary viewing region and the subsidiary viewing region comprises at least one row of light-emitting components in the plurality of light-emitting components;

the micro control circuit is configured to output a selection signal to the selection control circuit and output a control signal to the backlight driver chip after a scanning of one of the plurality of display sub-regions corresponding to the primary viewing region or the subsidiary viewing region is completed;

the selection control circuit is configured to select the light-emitting components within the primary viewing region or the subsidiary viewing region according to the selection signal;

the backlight driver chip is configured to supply a drive current to the light-emitting components within the primary viewing region or subsidiary viewing region that is selected according to the control signal;

a plurality of backlight driver chips are provided, the micro control circuit is directly connected with the selection control circuit, the selection control circuit is directly connected with the plurality of backlight driver chips, and the plurality of backlight driver chips are directly connected with the plurality of light-emitting components; and wherein the plurality of backlight driver chips are overlapped with the backlight source.

2. The backlight module according to claim 1, wherein the plurality of backlight driver chips are arranged in an array, each of the plurality of backlight driver chips is connected with the light-emitting components within one light-emitting region, backlight driver chips of a same row are connected with a same terminal of the selection control circuit, backlight driver chips of different rows are connected with different terminals of the selection control circuit.

3. The backlight module according to claim 1, wherein a selected time of the light-emitting components within the primary viewing region starts from a completion of a scanning of one of the plurality of the display sub-regions corresponding to the primary viewing region, to a beginning of a next scanning of the display sub-region corresponding to the primary viewing region.

4. The backlight module according to claim 1, wherein the primary viewing region comprises a plurality of light-emitting regions arranged laterally, and at least one channel of the backlight driver chip is configured to supply a drive current to the light-emitting components within each of the plurality of light-emitting regions.

5. The backlight module according to claim 4, wherein the drive current supplied by the channel of the backlight driver chip to the light-emitting components in a corresponding light-emitting region, is determined by a grayscale value of pixels within a display partition corresponding to the light-emitting region.

6. The backlight module according to claim 4, wherein the subsidiary viewing region comprises a plurality of sub-partitions arranged longitudinally, each of the plurality of sub-partitions comprises a plurality of light-emitting regions arranged laterally; and the backlight driver chip is configured to supply a same drive current to the light-emitting components within at least two light-emitting regions of the sub-partition of the subsidiary viewing region.

7. The backlight module according to claim 6, wherein a selected time of the light-emitting components within each of the sub-partitions starts from a completion of a scanning of one of the plurality of display sub-regions corresponding to the sub-partition, to a beginning of a scanning of one of the plurality of display sub-regions corresponding to the primary viewing region or a next sub-partition that is adjacent to the sub-partition; and a selected time of the light-emitting components within the primary viewing region starts from a completion of a scanning of one of plurality of display sub-regions corresponding to the primary viewing region, to a beginning of a scanning of one of the plurality display sub-regions corresponding to a next sub-partition that is adjacent to the primary viewing region.

8. The backlight module according to claim 1, wherein the subsidiary viewing region comprises a plurality of sub-partitions arranged longitudinally, the plurality of sub-partitions are located at two opposite sides of the primary viewing region.

9. The backlight module according to claim 8, wherein each of the plurality of sub-partitions comprises a plurality of light-emitting regions arranged laterally;

the backlight driver chip is configured to supply a same drive current to the light-emitting components within at least two light-emitting regions of the sub-partition;

the drive current supplied by a channel of the backlight driver chip to the light-emitting components within the at least two light-emitting regions of the sub-partition, is determined by a grayscale value of pixels within display partitions corresponding to the at least two light-emitting regions of the sub-partition.

10. The backlight module according to claim 8, wherein a selected time of the light-emitting components within each of the sub-partitions starts from a completion of a scanning of one of the plurality of the display sub-regions corresponding to the sub-partition, to a beginning of a next scanning of the display sub-region corresponding to the sub-partition.

11. A display device, comprising the backlight module according to claim 1.

12. The backlight module according to claim 1, wherein orthographic projections of the plurality of backlight driver chips on the backlight source are arranged in an array.

13. The backlight module according to claim 1, wherein an orthographic projection of at least one of the plurality of backlight driver chips on the backlight source is located between adjacent ones of the plurality of light-emitting components.

14. A display device, comprising:

a display panel, comprising a display region, the display region comprising a plurality of display sub-regions; and a backlight module, comprising a micro control circuit, a selection control circuit, a backlight source and a backlight driver chip, wherein the backlight source comprises a backlight region, the backlight region comprises a plurality of backlight sub-regions, the plurality of backlight sub-regions are in a one-to-one correspondence with the plurality of display sub-regions, and each of the plurality of backlight sub-regions corresponds to one of the plurality of display sub-regions;

the backlight source comprises a plurality of light-emitting components arranged in an array; the backlight sub-region comprises at least one row of light-emitting components in the plurality of light-emitting components;

the micro control circuit is configured to output a selection signal to the selection control circuit and output a control signal to the backlight driver chip after a scanning of one of the plurality of display sub-regions corresponding to the backlight sub-region is completed;

the selection control circuit is configured to select the light-emitting components within the backlight sub-region according to the selection signal;

the backlight driver chip is configured to supply a drive current to the light-emitting components within the backlight sub-region that is selected according to the control signal;

a plurality of backlight driver chips are provided, the control circuit is directly connected with the selection control circuit, the selection control circuit is directly connected with the plurality of backlight driver chips, and the plurality of backlight driver chips are directly connected with the plurality of light-emitting components; and wherein an orthographic projection of at least one of the plurality of backlight driver chips on the backlight source is located between adjacent ones of the plurality of light-emitting components.

15. The display device according to claim 14, wherein the display sub-region comprises a plurality of display partitions arranged laterally, the backlight sub-region comprises a plurality of light-emitting regions arranged laterally, the plurality of display sub-regions are arranged longitudinally, and the plurality of backlight sub-regions are arranged longitudinally;

the display panel comprises a base substrate, an orthographic projection of each of the backlight sub-regions on the base substrate coincides with an orthographic projection of a corresponding display sub-region on the base substrate; and an orthographic projection of each of the light-emitting regions on the base substrate coincides with an orthographic projection of a corresponding display partition on the base substrate.

16. The display device according to claim 14, wherein the plurality of backlight driver chips are arranged in an array, each of the plurality of backlight driver chips is connected with the light-emitting components within one light-emitting region, backlight driver chips of a same row are connected with a same terminal of the selection control circuit, while backlight driver chips of different rows are connected with different terminals of the selection control circuit.

17. A driving method of a display device, the display device comprising:

a display panel, comprising a display region, the display region comprising a plurality of display sub-regions; and a backlight module, comprising a micro control circuit, a selection control circuit, a backlight source and a backlight driver chip, wherein the backlight source comprises a backlight region, the backlight region comprises a plurality of backlight sub-regions, the plurality of backlight sub-regions are in a one-to-one correspondence with the plurality of display sub-regions, and each of the plurality of backlight sub-regions corresponds to one of the plurality of display sub-regions;

the backlight source comprises a plurality of light-emitting components arranged in an array; the backlight sub-region comprises at least one row of light-emitting components in the plurality of light-emitting components;

a plurality of backlight driver chips are provided, the control circuit is directly connected with the selection control circuit, the selection control circuit is directly connected with the plurality of backlight driver chips, and the plurality of backlight driver chips are directly connected with the plurality of light-emitting components; and wherein the plurality of backlight driver chips are overlapped with the backlight source;

the driving method comprising:

outputting, by the micro control circuit, a selection signal to the selection control circuit and output a control signal to the backlight driver chip, after a scanning of one of the plurality of display sub-regions corresponding to the backlight sub-region is completed;

selecting, by the selection control circuit, the light-emitting components within the backlight sub-region according to the selection signal; and supplying, by the backlight driver chip, a drive current to the light-emitting components within the backlight sub-region that is selected according to the control signal.

18. The driving method according to claim 17, wherein a selected time of the light-emitting components within the backlight sub-region starts from a completion of a scanning of one of the plurality of display sub-regions corresponding to the backlight sub-region, to a beginning of a next scanning of the display sub-region corresponding to the backlight sub-region.

19. The driving method according to claim 17, wherein the micro control circuit is connected with the selection control circuit and the backlight driver chip, respectively; the backlight driver chip is connected with the plurality of light-emitting components through the selection control circuit; a selected time of the light-emitting components within the backlight sub-region starts from a completion of a scanning of one of the plurality of display sub-regions corresponding to the backlight sub-region, to a beginning of a scanning of the display sub-region corresponding to a next backlight sub-region that is adjacent to the backlight sub-region.

20. The driving method according to claim 17, wherein the plurality of backlight sub-regions are divided into a primary viewing region and a subsidiary viewing region, the primary viewing region comprises at least one backlight sub-region, the subsidiary viewing region comprises at least two backlight sub-regions; the at least two backlight sub-regions included in the subsidiary viewing region are located at opposite sides of the primary viewing region;

the driving method further comprises:

supplying, by the backlight driver chip, a same drive current to the light-emitting components within at least two light-emitting regions within the backlight sub-region of the subsidiary viewing region.

* * * * *